Jan. 4, 1927. 1,612,960
M. E. ANDERSON
SPOTLIGHT
Filed Jan. 14, 1924
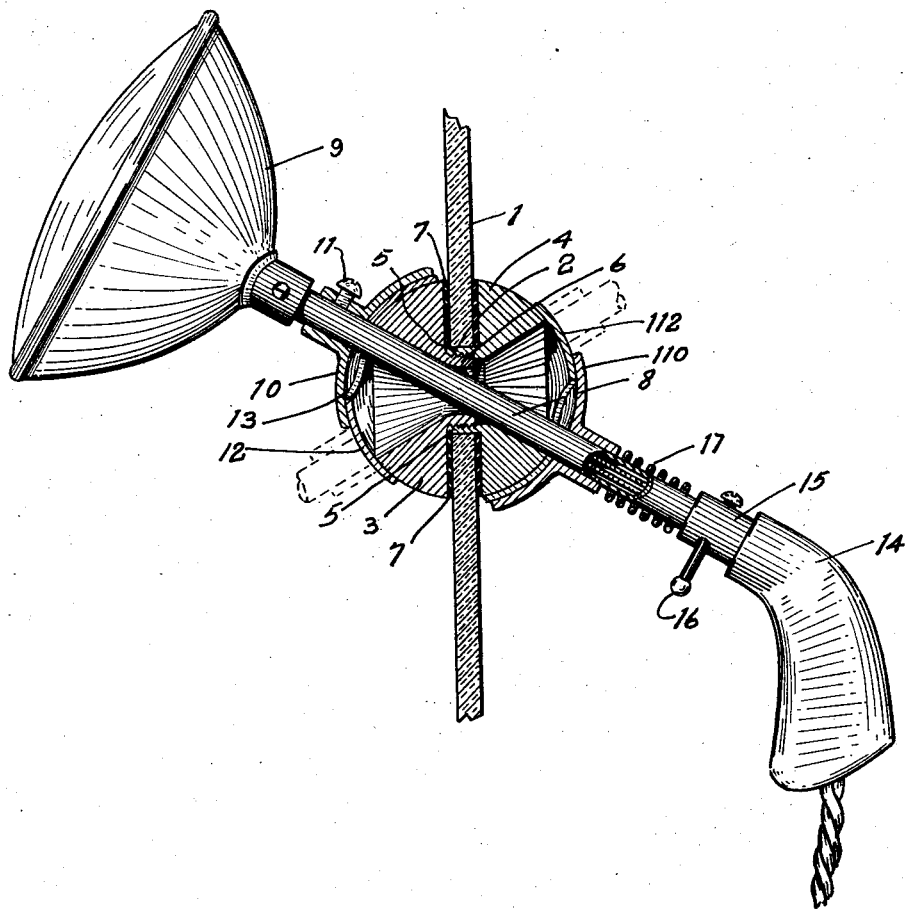
Inventor
Martin E. Anderson.
By A. J. O'Brien
Attorney Patented Jan. 4, 1927.

1,612,960

UNITED STATES PATENT OFFICE.

MARTIN E. ANDERSON, OF DENVER, COLORADO, ASSIGNOR TO THE CLYMER MANUFACTURING COMPANY, OF DENVER, COLORADO, A CORPORATION OF COLORADO.

SPOTLIGHT.

Application filed January 14, 1924. Serial No. 685,998.

This invention relates to spotlights of the type that are mounted for universal movement in the windshield of an automobile, and which extends through an opening in the windshield, a lamp being located on one side and a handle on the other.

It is the object of this invention to produce a spotlight that is so constructed that only a comparatively small hole is required to be cut through the glass of the windshield and which will permit the lamp to be moved through a comparatively wide angle.

My invention can be most clearly explained and most readily understood when reference is had to the accompanying drawing which shows a vertical section through the mounting, other parts being shown in elevation.

Numeral 1 represents the glass plate forming a part of an automobile windshield. Through plate 1 a hole 2 is cut. Two substantially semi-spherical members 3 and 4 are mounted in the opening in the glass in the manner shown. The member numbered 4 has a cylindrical part 5 whose outside diameter is slightly smaller than the hole in the glass. The part 5 is hollow and is internally threaded for the reception of the corresponding outwardly threaded cylindrical part 6 on the member 3. Resilient rubber or leather washers 7 are provided between the glass and the metal surfaces of the semi-spherical members. It is evident that by rotating the two parts 3 and 4 relative to each other, they may be clamped tightly against the surface of the glass. Each member 3 and 4 has a conical opening extending therethrough, a diametrical section of which has the form of an hour glass. The shape is quite clearly shown in the drawing. The smallest diameter of the opening in part 3 is slightly greater than the diameter of the tubular member 8, which carries the reflector 9 on its outer end. It is evident that the tubular member 8 can be moved to a limited extent in any direction and through an angle represented by that between the solid and dotted line position. Secured to the front end of the tubular member 8 between the reflector and the semi-spherical member 3, is a cap 10 which is curved about the same center as members 3 and 4. Cap 10 is held in place by means of a screw 11. Since it is very desirable to have the device so constructed that the lamp may be swung through the greatest angle possible, the larger end of the conical opening will be so great that the cap 10 cannot cover the same completely when the lamp is swung to its extreme position. In order to assure that the conical opening shall always be covered, I provide between the cap 10 and the spherical outer surface of member 3, a washer 12 which has the same curvature as the cap and which is provided centrally with an opening 13 that is considerably greater in diameter than the tube 8. The function of this washer is to cover that portion of the conical opening that cannot be covered by the cap. On the inner end of the tubular member 8 I provide another cap 110 which may be identical with cap 10. A washer 112 similar to washer 12, separates the cap from the semi-spherical member 4. To the inner end of the tube 8 I secure a handle 14 having a switch 15 associated therewith. A handle 16 serves as the means by which the switch is operated. I am not showing the construction of the switch for the reason that it is old and well known and is extensively employed in the manner shown. A spring 17 surrounds the tube 8 and serves to force the cap 110 and washer 112 against the surface of member 4 with sufficient pressure to cause enough friction to hold the lamp in any adjusted position.

The operation of the lamp is obvious from the drawing. It can be moved in any direction to the extent of the angular movement of the tube 8. The caps 10, 110 and washers 12 and 112 always keep the conical opening covered.

I am aware that lamps of this type have been constructed in which there is a spherical member secured to the tubular member and mounted for universal movement in a tubular mounting secured in an opening in the windshield. This construction requires a large hole to be cut in the glass and requires many parts. With the construction illustrated and described, only a very small hole needs to be cut through the glass and merely a few simple and inexpensive parts are used in the construction. The caps 10, 110 and washers 12 and 112 are identical and the semi-spherical members 3 and 4 are nearly so, thus making a construction that can be cheaply made and which will have a neat and pleasing appearance when installed. The fact that the mounting requires a much smaller hole to be drilled in the glass is of great practical importance as the glass is not weakened as much as when a larger hole is cut. The clamping action of the parts 3 and 4 more than compensate for the weakening of the glass, due to the small hole, with the result that the glass is in reality reinforced after the mounting is in place.

Having now described my invention, what I claim as new is:

1. A spotlight adapted to project through an opening in a windshield comprising, a tubular member, a lamp secured to one end of said member, a handle secured to the other end of said member, a substantially solid spherical bearing member adapted to be secured to the windshield, said bearing member having an opening extending therethrough, said opening tapering inwardly to a central point from opposite sides of said bearing member, a plurality of concentric overlapping caps secured to the tubular member and adapted to cooperate with the spherical bearing on one side thereof, a plurality of concentric overlapping caps secured to the tubular member and adapted to cooperate with the opposite side of said bearing, and resilient means for forcing said caps against the bearing so as to produce friction.

2. A windshield spotlight comprising a tubular member, a lamp on one end and a handle on the other end of said member, a bearing member comprising substantially solid semi-spherical elements secured together in an opening in the windshield, each of said elements having an opening extending therethrough to receive the tubular member and permit angular movement thereof within the opening, said openings being each of conical shape the perimeters of the bases of which lie in the surfaces of their respective semi-spherical elements, a plurality of caps carried by the tubular member in position to frictionally clamp said bearing member between them, and yielding means positioned between said semi-spherical elements and the windshield glass.

In testimony whereof I affix my signature.

MARTIN E. ANDERSON.